United States Patent

Matsui et al.

[11] 4,252,423
[45] Feb. 24, 1981

[54] IMAGE PROJECTOR

[75] Inventors: Yoshiya Matsui; Setsuo Minami; Noritaka Mochizuki, all of Yokohama, Japan

[73] Assignee: Canon Kabushiki Kaisha, Tokyo, Japan

[21] Appl. No.: 116,751

[22] Filed: Jan. 30, 1980

Related U.S. Application Data

[63] Continuation of Ser. No. 949,047, Oct. 6, 1978, abandoned.

[30] Foreign Application Priority Data

Oct. 7, 1977 [JP] Japan .................. 53/120739

[51] Int. Cl.³ .................................................. G03B 27/50
[52] U.S. Cl. ........................................ 353/20; 353/37; 353/98; 353/99; 355/51
[58] Field of Search ............... 355/50, 51; 353/98, 353/99, 20, 30, 37

[56] References Cited

U.S. PATENT DOCUMENTS

| | | | |
|---|---|---|---|
| 1,966,261 | 7/1934 | Petit et al. | 354/174 |
| 2,736,235 | 2/1956 | Tonlon | 350/433 |
| 3,060,805 | 10/1962 | Brumley | 350/445 |
| 3,544,190 | 12/1970 | Moorhusen et al. | 350/6 |
| 3,580,675 | 5/1971 | Hieber | 355/51 |
| 3,584,952 | 6/1971 | Gundlich | 355/52 |
| 3,592,542 | 7/1971 | Kaufer | 355/50 |
| 3,606,535 | 9/1971 | Koizumi | 355/51 |
| 3,609,024 | 9/1971 | Suzuki | 355/51 |
| 3,620,592 | 11/1971 | Freeman | 353/99 |
| 3,836,249 | 9/1974 | Weber | 355/51 |

FOREIGN PATENT DOCUMENTS 676947  6/1939  Fed. Rep. of Germany .
1344640 10/1964  France .

Primary Examiner—Steven L. Stephan
Attorney, Agent, or Firm—Fitzpatrick, Cella, Harper & Scinto

[57] ABSTRACT

An ommateal image projector of a type, in which a single or a plurality of rows of the so-called bar lenses having a longer length in the direction of its optical axis than the effective lens diameter thereof are arranged, each bar lens projecting a partial image of an object to be projected onto a mirror surface, and the partial image formed on this mirror surface forming again this partial image onto the image projecting surface by the same bar lens. The entire image of the object is formed on the projecting surface by row of the bar lenses, and the total image thus formed is an erected image.

7 Claims, 5 Drawing Figures

IMAGE PROJECTOR

This is a continuation of application Ser. No. 949,047, filed Oct. 6, 1978, now abandoned.

BACKGROUND OF THE INVENTION

1. Field of the Invention

This invention relates to an image projecting device to project an erected image of an object to be projected onto a projecting surface. More particularly, the invention is concerned with an ommateal image projector of a type, in which a single or a plurality of bar lenses having a longer length in the direction of the optical axis than the effective lens diameter thereof are arranged.

2. Description of the Prior Art

U.S. Pat. No. 3,605,593 teaches an image projecting device which projects an entire image of an object to be projected onto a projecting surface by arranging small lenses in a single or a plurality of rows, each of the small lenses projecting a partial image of the object to be projected onto the projecting surface.

This image projecting device has such an advantage that, in comparison with an image projector to project onto a projecting surface the entire image of the object to be projected by a single lens, a conjugate length, i.e., a length between the object to be projected and the image projecting surface, becomes short. On account of this, such ommateal image projector is used for scanning of an image original in an image reproduction apparatus, the overall size of which is desired to be reduced. For example, British Pat. No. 1,125,887 and U.S. Pat. No. 3,584,950 disclose image reproduction apparatuses which form an erecting image of the entire image original on a photosensitive material by moving the ommateal lens system relative to the image original and the photosensitive material.

Further, British Pat. No. 1,462,085 discloses an ommateal reflection type image projecting device which forms an overall image of an image original by projecting partial images of an object to be projected onto a mirror surface by use of individual small lenses constituting the ommateal lens system, and then re-forming the partial images formed on the mirror surface on the image projecting surface by the same small lenses.

The present invention is concerned with improvement in the ommateal reflection type image projecting device in this British patent, the characteristic point of which resides in the use of bar lenses for the ommateal lens system, each lens having a longer length in the direction of the optical axis thereof than the effective lens diameter.

Such bar lens has already been disclosed in U.S. Pat. No. 3,252,902. In addition, improvement in such bar lens has been done by the present inventors, and has been applied for a patent in the United States of America under application Ser. No. 889,404 (filed Mar. 23, 1978) and in the Federal Republic of Germany (West Germany) under application Ser. No. P 28 13 763.5 (filed Mar. 30, 1978).

SUMMARY OF THE INVENTION

It is an object of the present invention to provide an ommateal reflection type image projecting device using bar lenses.

DETAILED DESCRIPTION OF PREFERRED EMBODIMENTS

Figure 1:
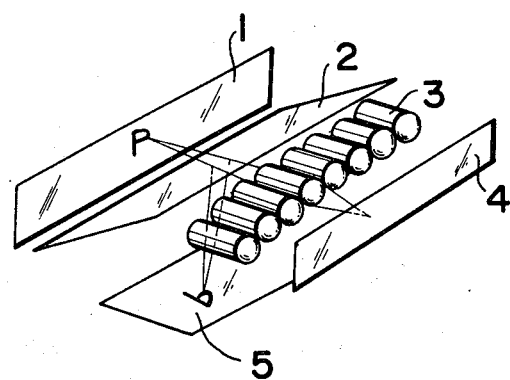
FIG. 1 is a schematic perspective view showing one embodiment of the image projecting device according to the present invention.

Referring to FIG. 1 which shows an optical layout of the image projecting device according to the present invention, a reference numeral 1 designates an object, a numeral 2 refers to a half mirror positioned with an inclination of 45 degrees, a numeral 3 refers to a so-called "bar lens" having a considerably long length along the optical axis thereof in comparison with the effective lens diameter thereof. A plurality of the bar lenses 3 are arranged in a single dimension along the longitudinal direction of the object. A reference numeral 4 designates a mirror disposed at a position conjugative, or substantially conjugative, with the object 1. A numeral 5 refers to an image projecting surface. Now, if one of the lenses 3 has its field to cover a letter "P", an image of this letter "P" is formed on the mirror 4, or in its vicinity, by the lens 3. Light which has formed the image of this letter "P" is reflected by the mirror 4, re-enters into the lens 3, and is directed to the image projecting surface by the half mirror 2, whereby a mirror image of the letter "P" is formed on this image projecting surface 5.

Figure 2:
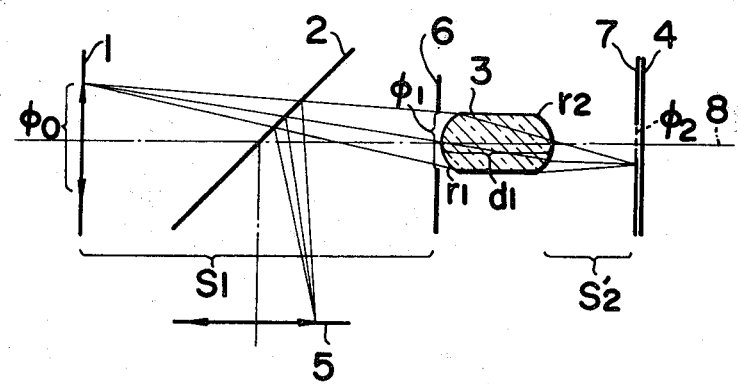
FIG. 2 is a light diagram of the device shown in FIG. 1.

FIG. 2 shows a light diagram of the device shown in FIG. 1. In the drawing, a reference numeral 6 designates an aperture diaphragm, 7 a field stop, and 8 an optical axis. Explaining in detail about the lens 3, it has been found out by the inventors that, according to their experiments, favorable results can be obtained by constructing the lens to have its thickness along the optical axis thereof at a ratio of from 2 to 60 times as thick as the effective lens diameter. Also, as will be detailed hereinafter, designing of the lens 3 should desirably satisfy equations (6) to (10). This will be explained in detail in the following. For sake of simplicity of explanation, reference numerals and symbols in FIG. 2 will be used.

As shown in the drawing, the radius of curvature of the first surface of the lens 3, i.e., the surface at the side of the object boundary, is represented by $r_1$, the radius of curvature of the second surface of the lens 3, i.e., the surface at the side of the image boundary, is represented by $r_2$ (a negative quantity in the drawing), thickness at the center of the lens, i.e., a lens thickness between the first and the second surface along the optical axis is represented by $d'_1$, and the principal refractive index of the lens material, i.e., a representative refractive index to a designed wavelength, is denoted by $n'_1$. Further, the effective diameter of this lens is represented by $\phi_1$, a size of the object P by $\phi_0$, a size of an intermediate image to be formed by the lens 3 by $\phi_2$, a distance from the first surface of the lens 3 to the object P by $S_1$, (a negative quantity in the drawing), and a distance from the second surface to the intermediate imate by $S'_2$. Moreover, lateral magnification of the intermediate image to the object P is represented by $\beta_1(=-|\phi_2/\phi_0|)$. The effective F number at the object side of this lens 3 is represented by Fe. The effective F number to be determined from the illuminating condition, i.e., $$Fe = \frac{\sqrt{S_1^2 + (\frac{\phi_1}{2})^2}}{\phi_1} \tag{1}$$

the lateral magnification $\beta_1(|\beta_1|<1)$ of the intermediate image which is set not to cause shading of the partial image, the object distance $S_1$, and a lens back $S'_2$ upto the intermediate image are all predeterminable quantities. The principal refractive index $n'_1$ of the lens can be determined by selection of the material to be used. With these five setting quantities Fe, $\beta_1$, $S_1$, $S'_2$, and $n'_1$, the radius of curvature $r_1$ of the first surface of the lens 3, the radius of curvature $r_2$ of the second surface of the lens 3, the lens thickness $b'_1$ at the center thereof, and the effective lens diameter $\phi_1$, and the effective partial diameter of the object $\phi_0$ can be determined under the following conditions using the ideal image forming principle.

First of all, the relationship between the lateral magnification $\beta_1$ and the constructional data of the lens are given by the following equation.

$$\beta_1 = \frac{1}{(\phi_1 + \phi_2 - \phi_1 e_1'\phi_2)S_1 + (1 - e_1'\phi_2)} \tag{2}$$

where:

$\phi_1 = \frac{n_1' - 1}{r_1}$ (Refractive Power of the First Plane)

$\phi_2 = \frac{1 - n_1'}{r_2}$ (Refractive Power of the Second Plane)

$e_1' = \frac{d_1'}{n_1'}$

Next, the condition, under which the principal light rays of the incident light beam from the object, i.e., the light rays passing through the center of the first surface, are projected in parallel with the optical axis after they have been projected from the second surface, is represented by the following relationship, in view of the focal distance of the second surface (i.e., $1/\phi_2$) being just equal to $e'_1$.

$$\frac{1}{\phi_2} = e_1' \tag{3}$$

Further, in view of the fact that the light rays beneath the light beam travel along the edge of the lens 3 parallel to the light beam after they have passed through the first surface, as the condition for the incident light beam to the lens 3 from the edge of the effective object diameter $\phi_0$ not being shaded or eclipsed, the following equation is obtained.

$$\phi_1 = -\frac{1}{S_1}(1 + \frac{\phi_0}{\phi_1}) \tag{4}$$

Lastly, from the condition to maintain the distance $S'_2$ from the second surface of the lens 3 to the position of the intermediate image in a predetermined proper value, the following equation becomes necessary.

$$S_2' = \beta_1 \times \{(1 - \phi_1 e_1')S_1 - e_1'\} \tag{5}$$

By simultaneous solution of the abovementioned conditions in the equations (1) to (5) with respect to $r_1$, $r_2$; $d'_1$, $\phi_1$; and $\phi_0$, the following results can be primarily obtained.

$$r_1 = (n_1' - 1) \times \frac{\beta_1 S_1}{\left[(1 - \beta_1) - \frac{S_2'}{\beta_1 S_1}\right]} \tag{6}$$

$$r_2 = (1 - n_1') \times \beta_1 S_1 \tag{7}$$

$$d_1' = n_1' \times \beta_1 S_1 \tag{8}$$

$$\phi_1 = \frac{-S_1/Fe}{\sqrt{1 - (\frac{1}{2Fe})^2}} \tag{9}$$

$$\phi_0 = \left[\frac{(\frac{S_2'}{\beta_1}) - S_1}{\beta_1 S_1}\right] \times \phi_1 \tag{10}$$

Further, the present inventors have actually designed and verified that the lens 3 may be in a range of deviation by ±10% from the above-described conditional equations (6) to (10), i.e., it may be such one that is represented by the following equations.

$$K_1 \times (n_1' - 1) \times \frac{\beta_1 S_1}{\left[(1 - \beta_1) - \frac{S_2'}{\beta_1 S_1}\right]} \leq$$

$$r_1 \leq K_2 \times (n_1' - 1) \times \frac{\beta_1 S_1}{\left[(1 - \beta_1) - \frac{S_2'}{\beta_1 S_1}\right]}$$

$$K_1 \times (1 - n_1') \times \beta_1 S_1 \geq r_2 \geq K_2 \times (1 - n_1') \times \beta_1 S_1$$
$$K_1 \times n_1' \times \beta_1 S_1 \leq d_1' \leq K_2 \times n_1' \times \beta_1 S_1$$

$$K_1 \times \frac{-S_1/Fe}{1 - (\frac{1}{2Fe})^2} \leq \phi_1 \leq K_2 \times \frac{-S_1/Fe}{1 - (\frac{1}{2Fe})^2}$$

$$K_1 \times \left[\frac{(\frac{S_2'}{\beta_1}) - S_1}{\beta_1 S_1}\right] \times \phi_1 \leq$$

$$\phi_2 \leq K_2 \times \left[\frac{(\frac{S_2'}{\beta_1}) - S_1}{\beta_1 S_1}\right] \times \phi_1$$

where:
$K_1 = 0.9, K_2 = 1.1$

The following Table 1 shows the data of one example of such lens.

TABLE 1

| $\phi_0$ | $\phi_1$ | $S_2'$ | $S_1$ | $\beta_1$ | $n_1'$ | Material | $r_1$ | $r_2$ | $d_1'$ |
|---|---|---|---|---|---|---|---|---|---|
| 2.6 | 2.8 | 3.5 | −2.5 | −0.513 | 1.51633 | BK7 | 5.443 | −6.499 | 19.67 |

Figure 3:
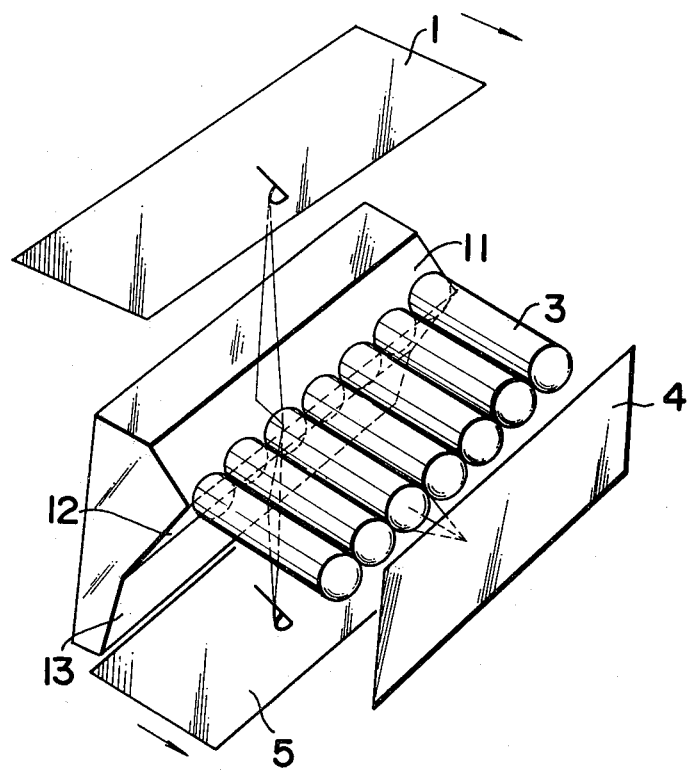
FIG. 3 is a schematic perspective view showing another embodiment of the image projecting device according to the present invention.

The embodiment shown in FIG. 1 is not so advantageous from the standpoint of effective use of light, since the half mirror is used. FIG. 3 shows another embodiment of the image projecting optical device which is most appropriately used for the image reproduction apparatus and which is advantageous from the standpoint of the effective use of light.

Figure 4:
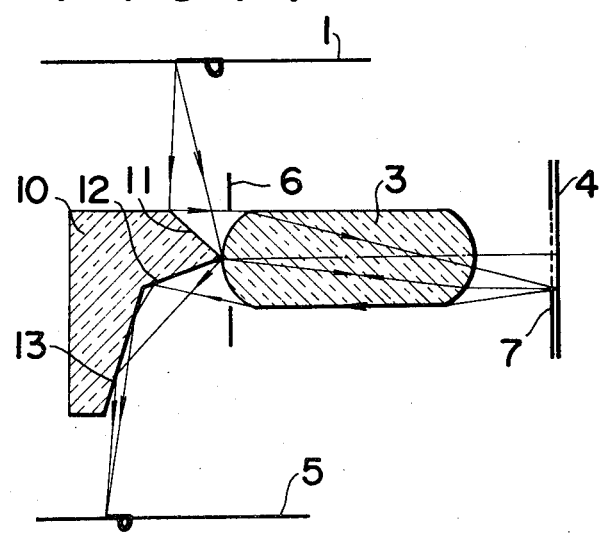
FIG. 4 is a light diagram of the device shown in FIG. 3.

In FIG. 3 which shows the optical layout of the image projecting device according to the present invention as incorporated in the image reproduction apparatus, a reference numeral 1 designates an image original to be reproduced. The image original 1 is disposed on a well-known image original mounting table. A numeral 10 refers to a prism block. On the surface of this prism, there are formed mirror surfaces 11, 12 and 13 which are inclined relative to the optical axis of the lens 3. A reference numeral 3 designates the so-called "bar lens" having a remarkably long length along its optical axis in comparison with its effective lens diameter. A numeral 4 refers to a mirror disposed in the image plane of the bar lens 3 or in its vicinity. A reference numeral 5 designates a photosensitive material, or a photosensitive drum. Though not shown in the drawing, there is provided a mechanism to move the image original and the photosensitive material in the arrow direction. The bar lenses 3, which are disposed in a row in the direction perpendicular to the moving direction of the image original and the photosensitive material, form on the mirror 4 slit-shaped partial images along the direction perpendicular to the moving direction of the image original 1. In the illustration, there is shown representatively a letter "P" which is within a range covered by one of the bar lenses at this slit-shaped portion. This state is explained in detail in FIG. 4. That is, light from the letter "P" on the image original 1 is reflected by the mirror surface 11, and enters from the upper part of the bar lens 3. Accordingly, an inverted intermediate image is formed on the mirror surface 4. It should be noted that this intermediate image is reduced to some extent. Light from the intermediate image on the mirror 4 enters again into the bar lens 3, and the light projecting from the lower part of this bar lens 3 is reflected by the mirror surfaces 12 and 13 to form mirror images at the equal position on the image projecting surface 5. By moving the image original and the photosensitive material 5 in the arrow direction, the entire image original is projected on the photosensitive material 5. In FIG. 4, a reference numeral 6 designates an aperture diaphragm, and 7 a field stop.

Figure 5:
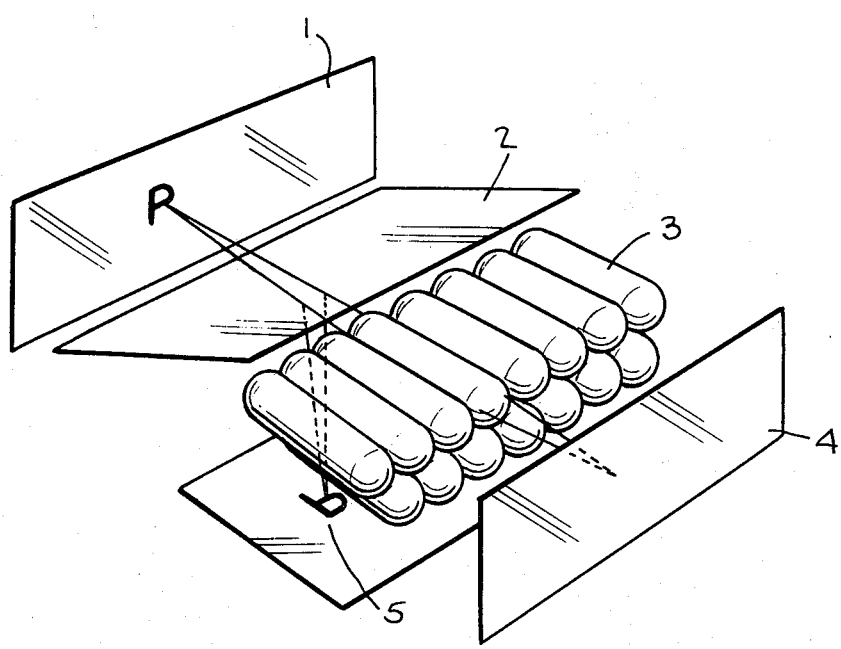
FIG. 5 is a schematic perspective view showing another embodiment of the present invention.

In the above-described embodiments, an example of the bar lenses arranged in a single row has been shown. It should be noted that the bar lenses may be arranged in double rows. It should also be noted that when the bar lenses are arranged in two or more rows, they may desirably be arranged in a zigzag form, as shown in FIG. 5.

What we claim is:

1. An image projecting device to project an object to be projected onto an image projecting surface which comprises:
  (a) Bar lenses arranged in at least one row, each of said bar lenses having a longer length in the optical axis direction thereof than the effective lens diameter thereof, and the constructional data and the effective diameter of said bar lens are given by the following equations:

$$K_1 \times (n_1' - 1) \times \frac{\beta_1 S_1}{\left[(1-\beta_1) - \frac{S_2'}{\beta_1 S_1}\right]} \leq r_1 \leq K_2 \times (n'-1) \times \frac{\beta_1 S_1}{\left[(1-\beta_1) - \frac{S_2'}{\beta_1 S_1}\right]}$$

$$K_1 \times (1 - n_1') \times \beta_1 S_1 \geq r_2 \geq K_2 \times (1 - n_1') \times \beta_1 S_1$$

$$K_1 \times n_1' \times \beta_1 S_1 \leq d_1' \leq K_2 \times n_1' \times \beta_1 S_1$$

$$K_1 \times \frac{-S_1/Fe}{1 - \frac{(1)^2}{2Fe}} \leq \phi_1 \leq K_2 \times \frac{-S_1/Fe}{1 - \frac{(1)^2}{2Fe}}$$

$$K_1 \times \left[\frac{(\frac{S_2'}{\beta_1}) - S_1}{\beta_1 S_1}\right] \times \phi_1 \leq \phi_2 \leq K_2 \times \left[\frac{(\frac{S_2'}{\beta_1}) - S_1}{\beta_1 S_1}\right] \times \phi_1$$

(where: $r_1$ is a radius of curvature of the lens surface at the object side; $r_2$ is a radius of curvature of the lens surface at the image side; $d'_1$ is a lens thickness on the optical axis between the surface of the lens at the object side and the surface of the lens at the image side; $\phi_1$ is an effective diameter of the lens; $\phi_0$ is a size of the object; $n'_1$ is a refractive index of the material for the lens with respect to the designed wavelength; $\beta_1$ is a lateral magnification of the lens; $S_1$ is a distance along the optical axis to the object surface with the lens surface at the object side being made the standard; $S'_2$ is a distance along the optical axis to the intermediate image with the lens surface at the image side being made the standard; $Fe$ is an effective F number at the object side; and $K_1 = 0.9$ and $K_2 = 1.1$); and (b) a reflecting body, on which partial image of said object for projecting is formed by the bar lenses, and from which light of said partial image is redirected to the same bar lenses.

2. An image projecting device for projecting an image of an original onto a photosensitive member, comprising:
  an original holder for holding an original;
  a projection optical system, located between said original holder and a photosensitive member, for forming an image of the original on the photosensitive member, said optical system including,
  a plurality of bar lenses each having a length, in the direction of its optical axis, relatively large as compared with its effective diameter, and having a curved surface at opposite ends thereof, the bar lenses being arranged in a row and forming a part of the image of the original on an intermediate imaging plane, and
  a plane mirror, disposed at the intermediate imaging plane, for directing the partial intermediate images to the respective bar lenses to form an erecting image on the photosensitive member.

3. An image projecting device according to claim 2 wherein said original holder and said photosensitive member move integrally with each other with respect to said projection optical system.

4. An image projecting device for projecting an image of an object, comprising:
  a plurality of bar lenses each having a length, in the direction of its optical axis, relatively large as compared with its effective diameter, and having a curved surface at opposite ends thereof, the bar lenses being arranged in a zigzag relationship in at least two rows and forming a part of the image of the object on an intermediate imaging plane, and
  a plane mirror, disposed at the intermediate imaging plane, for directing the partial intermediate images to the respective bar lenses to form an erecting image on a projection surface which is conjugate with said plane mirror with respect to said bar lenses.

5. An image projecting device for projecting an image of an object, comprising:
- a plurality of bar lenses each having a length, in the direction of its optical axis, relatively large as compared with its effective diameter, and having a curved surface at opposite ends thereof, the bar lenses being arranged in at least one row;
- a plane mirror located conjugate with the object to be projected with respect to said bar lenses; and
- a beam splitter, located between said bar lenses and the object to be photographed, for allowing the light from the object to enter said bar lenses, and directing the light from the bar lenses to a surface located conjugate with said plane mirror with respect to said bar lenses.

6. An image projecting device for projecting an image of an object comprising:
- a plurality of bar lenses each having a length, in the direction of its optical axis, relatively large as compared with its effective diameter, and having a curved surface at opposite ends thereof, the bar lenses being arranged in at least one row;
- a plane mirror located conjugate with the object to be projected with respect to said bar lenses;
- a reflector, located between said bar lens and the object, for directing the light from the object to bar lenses so that each of said bar lenses forms a partial image of the object on said plane mirror; and
- reflecting means for directing the light reflected by said plane mirror and passed through said bar lenses to a projection surface to form thereon an image of the object.

7. An image projection device for projecting an image of an object, comprising:
- a plurality of bar lenses each having a length, in the direction of its optical axis, relatively large as compared with its effective diameter, and having a curved surface at opposite ends thereof, the bar lenses being arranged in at least one row; and
- a plane mirror, located at an intermediate image forming plane of said bar lenses, for directing partial intermediate images formed by said bar lenses to the respective bar lenses.

* * * * *

UNITED STATES PATENT AND TRADEMARK OFFICE
CERTIFICATE OF CORRECTION

PATENT NO. : 4,252,423

DATED : February 24, 1981

INVENTOR(S) : YOSHIYA MATSUI, et al.

It is certified that error appears in the above—identified patent and that said Letters Patent is hereby corrected as shown below:

Col. 3, line 1, change "imate" to --image--;

line 33, (Equation 2), change "$\phi$" to --$\psi$-- (all occurrences);

line 35, change "$\phi_1$" to --$\psi_1$--;

line 38, change "$\phi_2$" to --$\psi_2$--;

line 40, change "$\phi_1' = \frac{d_1'}{n_1}$" to -- $\psi_1' = \frac{d_1'}{n_1'}$ -- line 50, (Equation 3), change "$\phi_2$" to --$\psi_2$--;

line 63, (Equation 4), change "$\phi_1$" to --$\psi_1$-- (first occurrence;

Col. 4, line 2, (Equation 5), change "$\phi_1$" to --$\psi_1$--;

line 10, (Equation 6), change "$n_1$'" to --$n'_1$--;

line 11, (Equation 6), change "$S_2$' " to --$S'_2$--;

UNITED STATES PATENT AND TRADEMARK OFFICE
CERTIFICATE OF CORRECTION

PATENT NO. : 4,252,423

DATED : February 24, 1981

INVENTOR(S) : YOSHIYA MATSUI, et al.

It is certified that error appears in the above—identified patent and that said Letters Patent is hereby corrected as shown below:

Col. 4, line 13, (Equation 7), change "$n_1'$" to --$n'_1$--;

line 14, (Equation 8), change "$d_1'$" to --$d'_1$--; and change "$n_1'$" to --$n'_1$--;

line 18, (Equation 10), change "$S_2'$" to --$S'_2$--;

line 29, change "$n_1'$" to --$n'_1$--;

line 30, change "$S_2'$" to --$S_2$--;

line 32, change "$n_1'$" to --$n'_1$--;

line 33, change "$S_1'$" to --$S'_2$--;

line 35, change "$n_1'$" to --$n'_1$-- (both occurrences);

line 36, change "$n_1'$" to --$n'_1$-- (both occurrences); and also change "$d_1'$" to --$d'_1$--;

lines 40, 43 and 54, change "$S_2'$" to --$S'_2$--.

Col. 5, line 57, change "$n_1'$" to --$n'_1$--;

line 58, change "$S_1'$" to --$S'_2$--;

UNITED STATES PATENT AND TRADEMARK OFFICE
CERTIFICATE OF CORRECTION

PATENT NO. : 4,252,423

DATED : February 24, 1981

INVENTOR(S) : YOSHIYA MATSUI, et al.

It is certified that error appears in the above—identified patent and that said Letters Patent is hereby corrected as shown below:

Col. 5, line 63, change " $S_2'$ " to -- $S'_2$ --;

line 64, change " $n_1'$ " to -- $n'_1$ -- (both occurrences);

line 65, change " $n_1'$ " to -- $n'_1$ -- (both occurrences) and change " $d_1'$ " to -- $d'_1$ --.

Col. 6, line 3, change " $S_2'$ " to -- $S'_2$ --;

line 8, change " $S_1'$ " to -- $S'_2$ --.

Col. 4, line 54, change " $n_1'$ " to -- $n'_1$ --; and change " $d_1'$ " to -- $d'_1$ --.

Signed and Sealed this

Fourteenth Day of July 1981

[SEAL]

Attest:

Attesting Officer

GERALD J. MOSSINGHOFF

Commissioner of Patents and Trademarks